Oct. 26, 1954   R. J. CATHERS   2,692,588
VALVE TIMING AND OPERATING DEVICE FOR COMBUSTION ENGINES
Filed Sept. 24, 1951   2 Sheets-Sheet 1
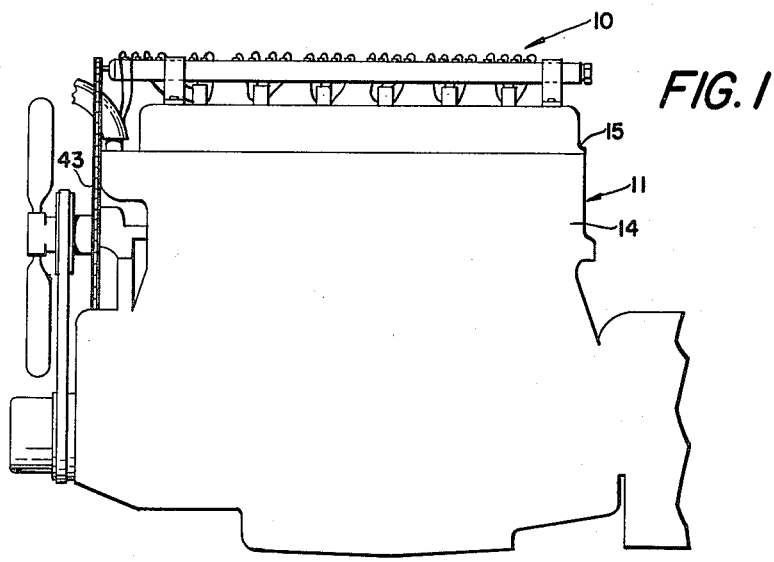
FIG. 1
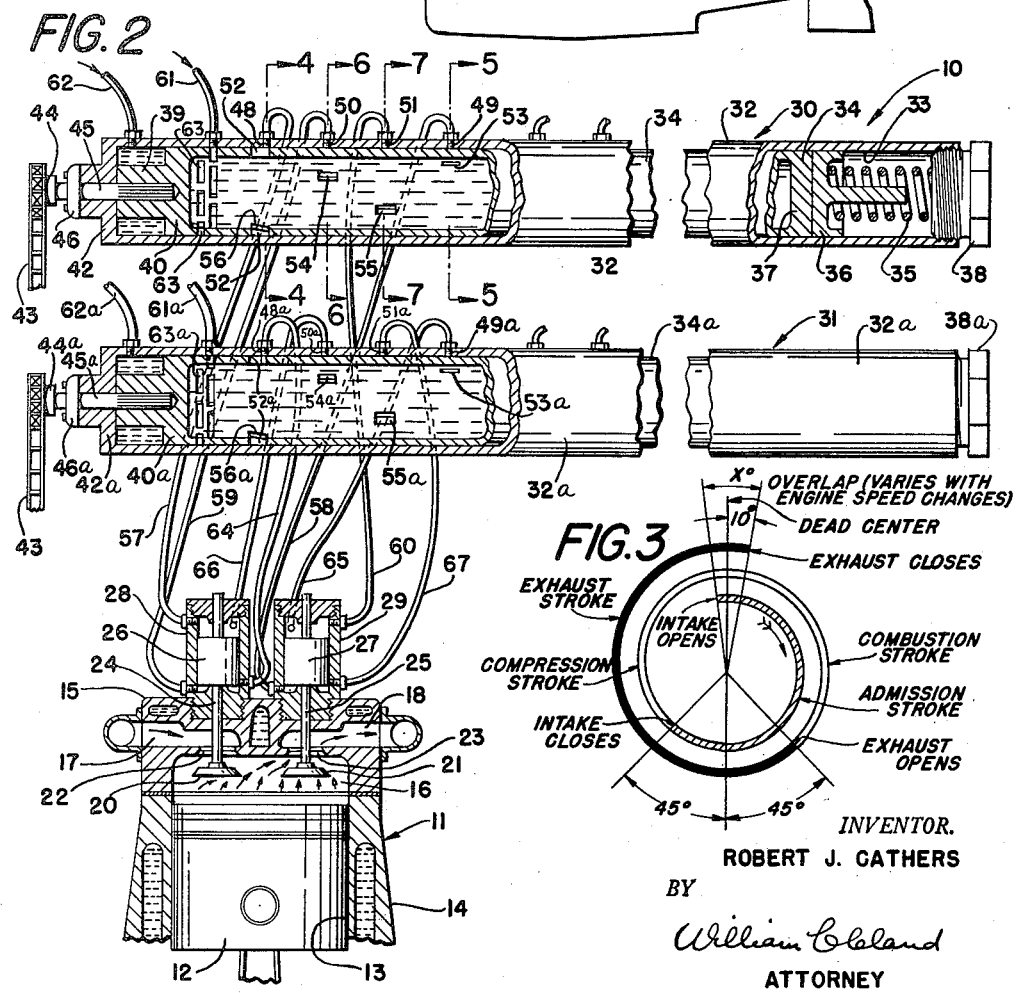
INVENTOR.
ROBERT J. CATHERS
BY
William Cleland
ATTORNEY Oct. 26, 1954  R. J. CATHERS  2,692,588
VALVE TIMING AND OPERATING DEVICE FOR COMBUSTION ENGINES
Filed Sept. 24, 1951  2 Sheets-Sheet 2

INVENTOR.
ROBERT J. CATHERS
BY
William Cleland
ATTORNEY

Patented Oct. 26, 1954

2,692,588

UNITED STATES PATENT OFFICE 2,692,588

VALVE TIMING AND OPERATING DEVICE FOR COMBUSTION ENGINES

Robert J. Cathers, Akron, Ohio, assignor of one-half to Robert Johnson Cathers, Cuyahoga Falls, Ohio Application September 24, 1951, Serial No. 247,963

14 Claims. (Cl. 123—90)

This invention relates to a valve timing and operating device for combustion engines.

Heretofore, in the automotive field, for example, the usual intake and exhaust valves of combustion engines have been timed and operated by means of a cham shaft rotated by a drive mechanism from the usual crank shaft of the engine. When such a cam shaft construction is used it is difficult to make even minor adjustments for wear on valve tappets and other parts of the mechanism. Moreover, the usual overlapping of the periods of simultaneous opening of the exhaust and inlet valves has been necessarily fixed for all speeds of the engine, and hence maximum efficiency of the combustion charge and smoothness of operation of the engine has not been attainable.

One object of this invention is to provide a valve timing and operating device for combustion engines, wherein is eliminated the usual valve-timer cam shaft, valve tappets and related troublesome parts which are difficult to install and adjust, and wherein is substituted a simple, compact mechanism which is relatively simple and economical to manufacture, as well as easy to install and to adjust.

Another object of the invention is to provide a mechanism of the character described for combustion engines wherein means is provided for self-adjustment of the desired overlap of the engine intake and exhaust valves according to the speed of the engine, whereby the efficiency and operating smoothness thereof is greatly improved.

These and other objects of the invention will be manifest from the following brief description and the accompanying drawings.

Of the accompanying drawings: Figure 1 is a side elevation, partly broken away, illustrating a valve timing control incorporated in a four cycle combustion engine.

Figure 2 is an enlarged semi-diagrammatic view, partly broken away and in section, of the timing control.

Figure 3 is a diagram illustrating a cycle of operation of the intake and exhaust valves of one engine cylinder for a four stroke cycle of the piston thereof.

Figures 4, 5, 6 and 7 are enlarged cross-sections, partly broken away and in section, taken on the lines 4—4, 5—5, 6—6 and 7—7, respectively, of Figure 2, and illustrating relative positions of timing valve ports with respect to mating orifices thereof at the beginning of a fuel-intake stage of a cycle of operation of the device.

Figure 4:
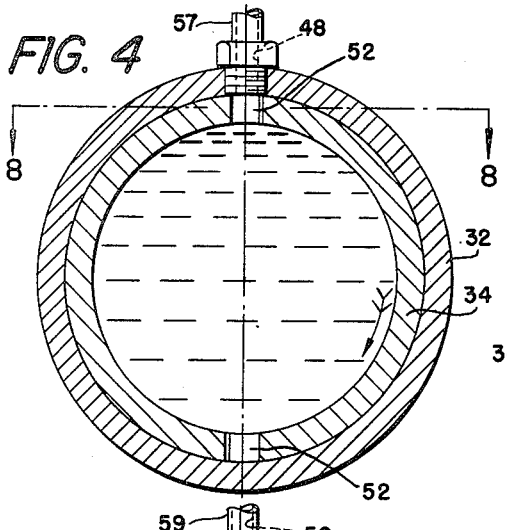
Figure 5:
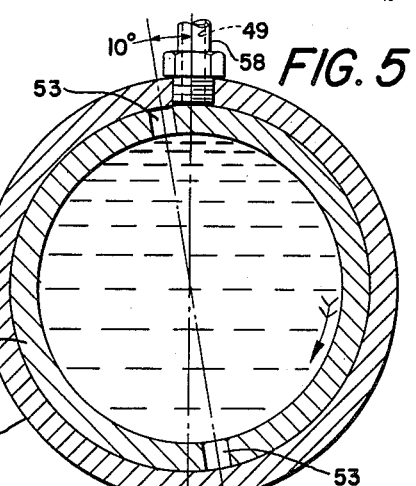
Figure 6:
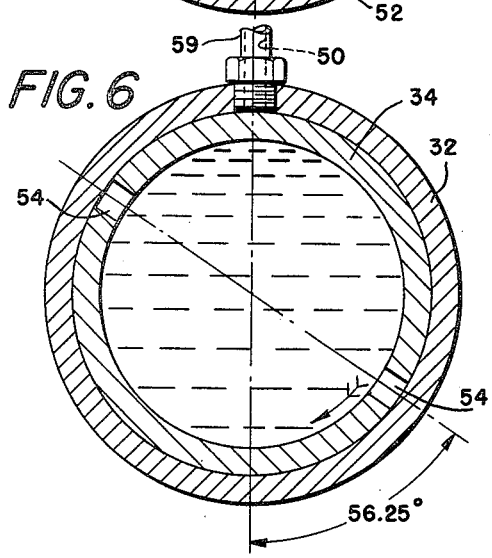
Figure 7:
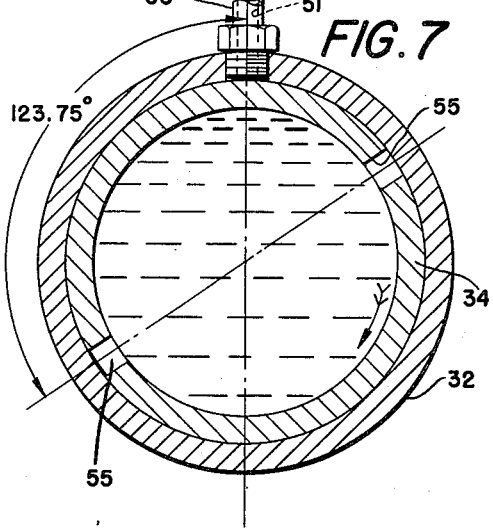
Figure 8:
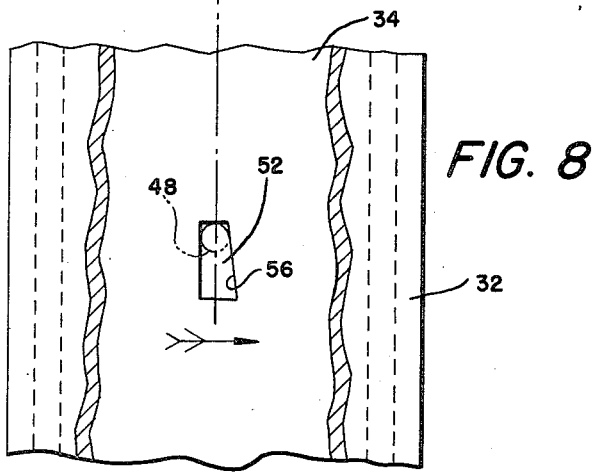

Figure 8 is a fragmentary plan view, partly broken away, illustrating the intake-opening port which automatically varies the overlap of the intake and exhaust valves according to the speed of the engine.

Referring particularly to Figures 1 and 2 of the drawings, the numeral 10 designates generally a valve timing and operating device embodying the features of the invention, installed in a six cylinder, four cycle combustion engine 11, of the type used on automatic vehicles. The engine shown is of known type wherein the pistons 12 are vertically reciprocated in cylinders 13 in the engine block 14 by the usual crank shaft (not shown). A cylinder head 15 secured to the top of the block 14 defines combustion chambers 16 and provides intake and exhaust chambers 17 and 18 communicating with intake and exhaust manifolds, respectively.

Intake and exhaust valves 20 and 21 for each engine cylinder are vertically reciprocably mounted in the head 15 for seating in inwardly presented seats 22 and 23, stems 24 and 25 thereof having pistons 26 and 27 secured thereon to be reciprocable within pressure-fluid cylinders 28 and 29 removably secured to the head (see Figure 2).

The timing and operating device 10, for all engine cylinders, may comprise separate timing and return-flow valve units 30 and 31, respectively, suitably affixed on top of the head 15 of the engine, and which for the present purposes are identical except as will be pointed out later.

Timing unit 30, for example, may include an elongated cylinder 32 within a bore 33 of which a hollow cylindrical valve 34 is mounted to be rotatable and to be reciprocable against the yielding resistance of a compression spring 35 suitably engaged between a cup 36, non-rotatably held against an after end wall 37 of the valve, and a closure cap 38 adjustably threaded in the corresponding end of the cylinder. The spring 35 normally tends to urge the valve 34 forwardly to stop engagement of a boss 39, projecting from a forward closure wall 40 of valve 34, with a closure wall 42 at the corresponding end of cylinder 32. Rotation of valve 34, in suitably timed relation to the rotation of the engine crank shaft (not shown), may be accomplished as by means of a chain 43, driven by the engine crank shaft, engaging over a sprocket 44 on a shaft 45 journalled through wall 42 and splined into the boss 39 of the valve. A suitable collar 46 fixed on cylinder 32 prevents axial shifting of shaft 45 while permitting rotation of the same.

Provided in the peripheral wall of fixed cylinder 32 may be separate series of four orifices for each said engine cylinder, these being designated the intake-opening, exhaust-closing, intake-closing, and exhaust-opening orifices 48, 49, 50 and 51, respectively. Corresponding series of axially elongated ports 52, 53, 54 and 55 are arranged in the peripheral wall of the valve 34 in off-set relation for registry with the respective said orifices to open and close the intake and exhaust valves 20 and 23, in requisite timed relation as will be described later. Two series of ports 52 to 55 are shown in the drawings, whereby upon rotation of the valve 34 at one fourth the speed of the engine crank-shaft each valve 20 and 21 will be opened and closed once during two revolutions of the crank-shaft. By providing a greater number of series of ports the valve 34 may be operated at proportionately slower speeds.

Oil under pressure is supplied to the interior of timer valve 34, in all rotated and longitudinally shifted positions thereof, from the engine oil pump (not shown), through a conduit 61 to an opening in the peripheral wall of cylinder 32 adapted to be in constant registry with peripherally and longitudinally closely spaced openings 63, 63 in the peripheral wall of valve 34. Upon successive momentary registry of ports 52 and 53 with orifices 48 and 49, pressure fluid from rotary valve 34 is supplied to the top and bottom ends of cylinders 28 and 29 to open the intake valve and close the exhaust valve, respectively, through conduits 57 and 58, respectively. Figure 2 shows valve 20 open and valve 21 about to close, after an overlap period. In continuing succession, the ports 54 and 55 will register with the orifices 50 and 51 to supply the pressure fluid to the bottom and top ends of cylinders 28 and 29, through conduits 59 and 60, to close the intake valve and open the exhaust valve, respectively. The valves 20 and 21 are only moved at the instant of registry of the respective ports with the corresponding orifices. This is the relative order of a complete cycle of operation of the intake and exhaust valves for four strokes of piston 12, which will be further explained later. Pressurized oil, also supplied from the engine pump, is supplied through a conduit 62 to a chamber defined between the forward end wall 42 of the cylinder 32 and end wall 40 of valve 34, the arrangement being such that at a predeterminately low engine speed the valve 34 will be as shown in Figure 2, but as the engine speed is increased, to increase the oil pressure in the system, the valve 34 is urged proportionately to the right (see Figure 2) against the action of spring 35. This axial movement may be utilized to increase the engine valve overlap in proportion to increasees in speed of the engine, by providing the leading edge portion 56 of the intake port 52 at a suitable angle to the axis of the bores 33 (see Figure 8), by which the registry with the intake orifice takes place proportionately earlier as the valve 34 moves to the right as viewed in Figuse 2.

The return-flow unit 31 is utilized to return the pressure fluid to its source, namely the oil pump (not shown) in timed relation to the operation of the timer unit 30. To this end the unit 31 may be supstantially identical to unit 30, in construction and operation, and like parts herein are given like numerals with a letter "a" added, unless otherwise noted. Accordingly, the chain 43 drives a sprocket 44a to rotate a return-flow valve 34a at the same speed as valve 34. Conduits 64 and 65 carry the pressure fluid from the lower end of the intake cylinder 28 and the upper end of exhaust cylinder 29, respectively, to intake-opening and exhaust-closing, return-flow, orifices 48a and 49a in cylinder 32a, simultaneously with momentary registry of ports 52a and 53a therewith, as in the case of timer unit 30. In continuing succession, conduits 66 and 67 return pressure-fluid from the top end of cylinder 28 and the lower end of cylinder 29, respectively, to intake-closing and exhaust-opening, return-flow, orifices 54a and 55a, at the same time that registry of ports 54a and 55a with the same takes place. The openings in cylinders 28 and 29 for conduits 64, 65, 66 and 67 are located to be closed by the pistons 26 or 27 at the ends of the various piston strokes, to cushion said pistons against shock.

The operation of the apparatus will be best understood by reference to the drawings generally. With the engine 14 running at constant low speed, the rotary valves 34 and 34a will be at the extreme left of the cylinders 32 and 32a and are always rotated at one fourth the speed of the engine crank-shaft, so that both the intake and exhaust valves 20 and 21 of each engine cylinder 13 are opened and closed once during two revolutions of the crank-shaft, that is, during the admission, compression, combustion and exhaust strokes of piston 12, which take place in that order. The firing order in a six cylinder engine may be conventional, such as 1-4-2-6-3-5 or 1-5-3-6-2-4. While the engine is running, oil under pressure flows into the rotary valve through the conduit 61 and openings 63. Oil is maintained in valve 34a by continued operation of the system. At a predeterminately low speed there is insufficient oil pressure to move the rotary valves 34 and 34a to the right from the positions shown in Figure 2.

In Figures 2, and 4 to 8, the rotary cylinders are positioned to admit pressure fluid through port 52, orifice 48, conduit 57, to the top of cylinder 28, which has forced the piston 26 down to open intake valve 20. At this intake-opening stage the exhaust valve 21 has not yet opened (see Figure 5). That is, as is best shown in the diagram of Figure 3, the intake valve is opened at dead center of the engine piston, approximately 10° ahead of the exhaust-valve closing stage, to provide an "overlap" which is desirable for the sake of quiet operation, for if the intake began to open only after the exhaust had closed the effective valve-opening during a considerable part of the intake stroke would be so small that the incoming fuel charge would be seriously throttled.

Just beyond the dead center position (Figure 3) rotary valve port 53 momentarily registers with orifice 49 in cylinder 32, and pressure-fluid enters at the bottom of cylinder 27 to close exhaust valve 21, the oil at the top end of this cylinder being expelled through conduit 65, port 53a registering with orifice 49a, rotary cylinder 34a, and conduit 61a to the engine oil-pumping system.

Next, just beyond the end of the intake stroke, the intake valve is closed, by passage of pressure-fluid through port 54 and registering orifice 50, conduit 59, to the bottom of cylinders 28, the fluid being expelled to the oil pumping system, as before, through conduit 66, orifice 50a, valve port 54a, and conduit 57a.

Piston 13 now continues upwardly on its compression stroke and then downwardly on its explosion stroke, in known manner, and then just before the bottom of the explosion stroke (Figure 3) the exhaust valve 21 is opened by passage of pressure fluid from rotary valve 34 through port 55, orifice 51, conduit 60, to the top of cylinder 29, thereby urging piston 27 downwardly. Fluid is expelled from the bottom of this cylinder to the engine pumping system, through conduit 67, orifice 51a, port 55a, and conduit 61a. The piston 13 then continues toward the top of its fourth stroke, where the intake-opening and exhaust-closing stages are repeated to start another cycle of operation described, in which the second series of ports 52 to 54 of rotary valve 34 and corresponding ports 52a to 54a of valve 34a take part. The cycles are repeated in rapid succession on each engine cylinder 13, in firing order such as has been described.

Upon any increase in the speed of engine 11 the oil pressure is correspondingly increased thereby urging the rotary valves 34 and 34a proportionate distances to the right, as viewed in Figure 2. Thus, the intake port 52 and companion port 52a register with orifices 48 and 48a earlier and the inlet valve 20, therefore, is also opened earlier. This provides a desirable variation in the valving overlap, represented by the variant "x°" in Figure 3, whereby automatic adjustment of the valve overlap provides maximum efficiency of operation of the engine at all speeds. The effective overlap for best operation is easily adjusted by turning the threaded caps 38 and 38a of the valve units 30 and 31, respectively, to adjust the tension of the springs 35.

Modifications of the invention may be resorted to without departing from the spirit thereof or the scope of the appended claims. As an example, the valve timing and operating system described may be incorporated as an integral part of the engine cylinder head.

What is claimed is:

1. A timing control of the character described, comprising a relatively fixed member having an elongated bore therein, a hollow fluid-containing cylindrical valve closed at both ends and rotatable in said bore, inlet passage means for passage of pressure fluid to the interior of said valve in various positions of rotation of the same, a plurality of openings in the wall of said member, conduit means connecting said openings, ports in the wall of said valve for intermittent registry with corresponding said openings as said valve is rotated, thereby intermittently to permit passage of fluid between the interior of said valve and corresponding said conduit means, said ports being spaced for sequential registry with said openings, said valve being longitudinally slidable in said bore, adjusting means being provided for adjusting said valve to various positions longitudinally in said bore, said ports being elongated for said registry thereof with said openings in various longitudinally adjusted positions thereof in the bore, at least one of said ports being of varying width peripherally of the valve to vary the interval of its registry with a corresponding said opening in the wall of the member in different said longitudinally adjusted positions of the valve.

2. A timing control of the character described, comprising a relatively fixed member having an elongated bore therein, a hollow cylindrical valve rotatable in said bore, fluid inlet passage means in said valve for passage of pressure fluid between the interior and exterior thereof in various positions of rotation of the same, a plurality of openings in the wall of said member, conduit means connecting said openings, ports in the wall of said valve for intermittent registry with corresponding said openings as said valve is rotated, thereby intermittently to permit passage of fluid between the interior of said valve and corresponding said conduit means, said ports being spaced for sequential registry with said openings, adjusting means being provided for adjusting said valve to various positions longitudinally in said bore, said ports being elongated for said registry thereof with said openings in various longitudinally adjusted positions thereof in the bore, said adjusting means including a variable fluid pressure device applying pressure at one end of said valve, and yielding means at the other end of the valve resisting said pressure of said device.

3. A timing control of the character described, comprising relatively fixed means providing bores therein; hollow cylindrical inlet and outlet valves rotatable in the bores; means for rotating said valves; means for supplying pressure fluid from a source thereof to the interior of said inlet valve; a device to be operated by the timing control, including a pressure-fluid actuated means; a series of inlet and outlet orifices in said fixed means to the interior of the inlet and outlet bores, respectively; conduit means for passage of pressure fluid from said inlet orifices and through said pressure-fluid actuated means to the corresponding said outlet orifices; a series of ports in the wall of said inlet valve sequentially registerable with said inlet orifices as the inlet valve is rotated, and corresponding ports in the wall of said outlet valve sequentially registerable with corresponding said outlet orifices as the outlet valve is rotated; and means for returning pressure-fluid from the interior of said outlet valves to said source; said hydraulic actuated means thereby being operated by said sequential passage of pressure fluid through the conduit means when said inlet and outlet ports are in registry with corresponding inlet and outlet orifices.

4. A timing control of the character described, comprising relatively fixed means providing bores therein; hollow cylindrical inlet and outlet valves rotatable in the bores; means for rotating said valves; means for supplying pressure fluid from a source thereof to the interior of said inlet valve; a device to be operated by the timing control, including a hydraulic actuated means; a series of inlet and outlet orifices in said fixed means to the interior of the inlet and outlet bores, respectively; conduit means for passage of pressure fluid from said inlet orifices and through said hydraulic actuated means to the corresponding said outlet orifices; a series of ports in the wall of said inlet valve sequentially registerable with said inlet orifices as the inlet valve is rotated; and corresponding ports in the wall of said outlet valve sequentially registerable with the corresponding said outlet orifices; as the outlet valve is rotated; and means for receiving pressure fluid from the interior of said outlet valve; said hydraulic actuated means thereby being operated by said segmental passage of pressure fluid through the conduit means when said inlet and outlet ports are in registry with corresponding inlet and outlet orifices; adjusting means being provided for adjusting said valves longitudinally in the bores thereof, said valve ports being elongated for said registry thereof with said orifices in various longitudinally adjusted positions of the valves in the bores.

5. A timing control of the character described, comprising relatively fixed means providing bores therein; hollow cylindrical inlet and outlet valves rotatable in the bores; means for rotating said valves; means for supplying pressure fluid from a source thereof to the interior of said inlet valve; a device to be operated by the timing control, including a hydraulic actuated means; a series of inlet and outlet orifices in said fixed means to the interior of the inlet and outlet bores, respectively; conduit means for passage of pressure fluid from said inlet orifices and through said hydraulic actuated means to the corresponding said outlet orifices; a series of ports in the wall of said inlet valve sequentially registerable with said inlet orifices as the inlet valve is rotated; and corresponding ports in the wall of said outlet valve sequentially registerable with the corresponding said outlet orifices as the outlet valve is rotated; and means for receiving pressure fluid from the interior of said outlet valve; said hydraulic actuated means thereby being operated by said segmental passage of pressure fluid through the conduit means when said inlet and outlet ports are in registry with corresponding inlet and outlet orifices; adjusting means being provided for adjusting said valves longitudinally in the bores thereof, said valve ports being elongated for said registry thereof with said orifices in various longitudinally adjusted positions of the valves in the bores; at least one of said ports being of irregular shape to vary the interval of its said registry with the corresponding said orifice in different said longitudinally adjusted positions.

6. A timing control of the character described, comprising relatively fixed means providing bores therein; hollow cylindrical inlet and outlet valves rotatable in the bores; means for rotating said valves; means for supplying pressure fluid from a source thereof to the interior of said inlet valve; a device to be operated by the timing control, including a hydraulic actuated means; a series of inlet and outlet orifices in said fixed means to the interior of the inlet and outlet bores, respectively; conduit means for passage of pressure fluid from said inlet orifices and through said hydraulic actuated means to the corresponding said outlet orifices; a series of ports in the wall of said inlet valve sequentially registerable with said inlet orifices as the inlet valve is rotated; and corresponding ports in the wall of said outlet valve sequentially registerable with the corresponding said outlet orifices as the outlet valve is rotated; and means for receiving pressure fluid from the interior of said outlet valve; said hydraulic actuated means thereby being operated by said segmental passage of pressure fluid through the conduit means when said inlet and outlet ports are in registry with corresponding inlet and outlet orifices; adjusting means being provided for adjusting said valves longitudinally in the bores thereof, said valve ports being elongated for said registry thereof with said orifices in various longitudinally adjusted positions of the valves in the bores; at least one of said ports being of irregular shape to vary the interval of its said registry with the corresponding said orifice in different said longitudinally adjusted positions; said adjusting means including a fluid-pressure device applying pressure at one end of the inlet and outlet valves, and resilient means at the other ends of the same resisting said pressure of the fluid-pressure device.

7. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes, means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices.

8. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timting valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices, said actuated means comprising cylinders and fluid-pressure operated pistons therein operatively connected to the engine intake and exhaust valves.

9. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores.

10. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores; at least one of said ports being of irregular shape to vary the interval of its said registry with the corresponding said orifice in different said longitudinally adjusted positions.

11. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores; the ports in said timing and return-flow valves corresponding to said intake-opening orifices thereof having leading edge portions disposed angularly to vary the time of registry with the respective orifices in said longitudinally adjusted positions of the last-named valves.

12. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores; the ports in said timing and return-flow valves corresponding to said intake-opening orifices thereof having leading edge portions disposed angularly to vary the time of registry with the respective orifices in said longitudinally adjusted positions of the last-named valves; said adjusting means including fluid-pressure variable with the speed of the engine, and said angular leading edge portions being disposed to advance or retard said time of registry according to increases and decreases, respectively in said engine speed, whereby the usual overlap of said intake and exhaust is varied accordingly.

13. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores; said adjusting means including a fluid-pressure device applying pressure at one end of the inlet and outlet valves, and resilient means at the other ends of the same resisting said pressure of the fluid-pressure device.

14. A valve timing control as for combustion engines of the four stroke type having intake and exhaust valves for each engine piston cylinder, comprising a pair of relatively fixed timing and return-flow parts each having an elongated bore therein; hollow cylindrical timing and return-flow valves rotatable in the respective bores; means for rotating said timing and return-flow valves in timed relation to the engine piston strokes; means for supplying pressure fluid from a source thereof to the interior of said timing valve; for each said engine cylinder, pressure-fluid actuated devices for opening and closing corresponding said intake and exhaust valves; intake-opening, exhaust-closing, intake-closing and exhaust-opening orifices in the wall of said timing part, and corresponding return-flow orifices in the wall of said return-flow part; conduit means for passage of pressure-fluid from said timing valve orifices through said pressure-fluid actuated device to the corresponding said return-flow orifices; ports in the wall of said timer valve sequentially registerable with said timing orifices as said timing valve is rotated, and corresponding ports in the wall of said return-flow valve simultaneously registerable with the corresponding said return-flow orifices as the return-flow valve is rotated; and conduit means from the interior of said return-flow valve to said pressure-fluid source; said pressure-fluid actuated device thereby being actuated by said sequential passage of pressure-fluid through the various conduit means when said ports are in registry with the respective orifices; adjusting means being provided for adjusting said valves longitudinally in the bores thereof, said valve ports being elongated for said registry thereof with said orifices in various longitudinally adjusted positions of the valves in the bores; the ports in said timing and return-flow valves corresponding to said intake-opening orifices thereof having leading edge portions disposed angularly to vary the time of registry with the respective orifices in said longitudinally adjusted positions of the last-named valves; said adjusting means including fluid-pressure variable with the speed of the engine, and said angular leading edge portions being disposed to advance or retard said time of registry according to increases and decreases, respectively in said engine speed, whereby the usual overlap of said intake and exhaust is varied accordingly; said adjusting means including a fluid-pressure device applying pressure at one end of the timing and return-flow valves, and resilient means at the other ends of the same resisting said pressure of the fluid pressure device.

References Cited in the file of this patent

UNITED STATES PATENTS

| Number | Name | Date |
|---|---|---|
| 877,194 | Holzwarth | Jan. 21, 1908 |
| 1,807,832 | Davis | June 2, 1931 |
| 2,141,428 | Carroll | Dec. 27, 1938 |

FOREIGN PATENTS

| Number | Country | Date |
|---|---|---|
| 16,584 | Great Britain | 1903 |